Patented May 4, 1937

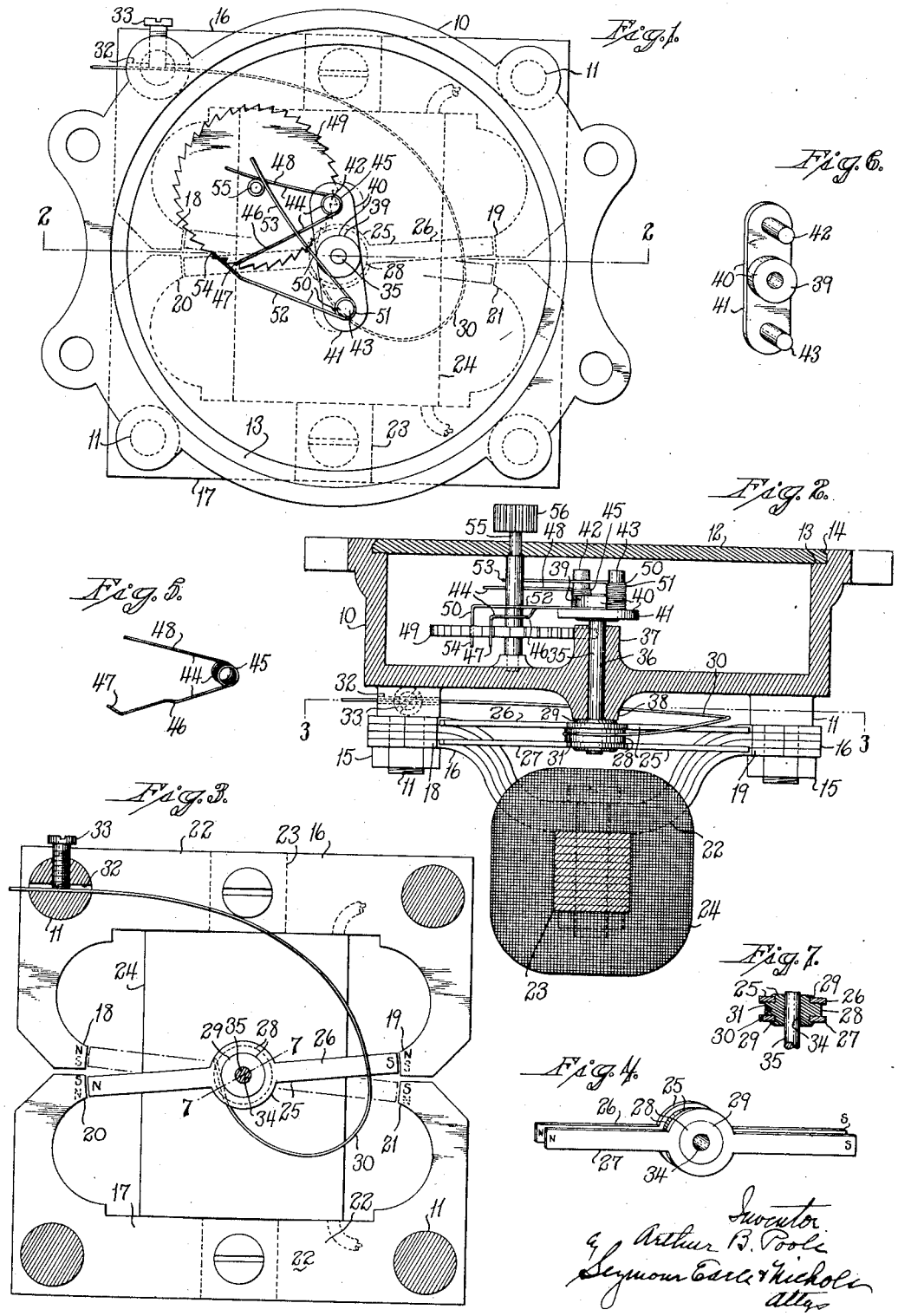

2,079,421

UNITED STATES PATENT OFFICE 2,079,421

VIBRATORY SYNCHRONOUS ELECTRIC MOTOR

Arthur B. Poole, Bristol, Conn., assignor to The E. Ingraham Company, Bristol, Conn., a corporation Application August 29, 1934, Serial No. 741,882

7 Claims. (Cl. 172—126)

This invention relates to vibratory electric motors, and particularly to vibratory electric motors capable of operating in synchronism with an alternating-current of commercial frequency.

One of the objects of the present invention is to provide a superior vibratory electric motor capable of operating in synchronism with alternating-currents of commercial frequencies.

A further object is to provide a superior vibratory electric motor capable of operating synchronously with an alternating-current of commercial frequency, without requiring the use of short-lived and otherwise objectionable make-and-break contact devices.

Another object is to provide a superior vibratory synchronous electric motor capable of operating in synchronism with an alternating-current of commercial frequency, without objectionable hum or noise.

A still further object is to provide a superior alternating-current synchronous motor-unit having a relatively slow-speed rotary power-output member driven from the armature with minimum gearing.

With the above objects and advantages in view, as well as others which will appear to those skilled in the art from the following, considered in conjunction with the accompanying drawing and appended claims, the present invention includes all of the novel features disclosed therein.

In the accompanying drawing:

Fig. 1 is a face view of one form which a vibratory synchronous electric motor embodying the present invention may assume;

Fig. 2 is a view thereof in transverse section, taken on the line 2—2 of Fig. 1;

Fig. 3 is a sectional view taken on the line 3—3 of Fig. 2;

Fig. 4 is a perspective view of the armature-unit, detached;

Fig. 5 is a similar view of one of the pawls, detached;

Fig. 6 is a corresponding view of the pawl-carrier; and

Fig. 7 is a broken, detail, sectional view taken on the line 7—7 of Fig. 3.

The particular vibratory synchronous electric motor herein chosen for the purpose of illustrating the present invention includes a cup-shaped housing 10 having outwardly offsetting from its bottom wall four (more or less) shouldered and threaded studs 11 and having its opposite end closed by a circular sealing-plate 12 held in place against a stop-shoulder 13 of the housing 10 by rolling or burring the metal of the said housing over the edge of the said plate as at 14.

Secured to the housing 10 by means of the studs 11 and suitable nuts 15 threaded thereon is an alternating-current stator comprising two complementary pole-pieces 16 and 17, each of substantially U-shaped form and respectively having polar-projections 18—19 and 20—21. The pole-pieces 16 and 17 just referred to are preferably laminated and composed of soft iron or other suitable magnetic material.

The mid-portion of each of the pole-pieces 16 and 17 is arched outwardly as at 22 away from the housing 10. The respective arched portions 22 just referred to of each of the pole-pieces 16 and 17 are interconnected by a laminated core 23 of soft iron or other suitable material which mounts an alternating-current energizing-coil 24 designed to be energized by alternating-current of commercial frequency and voltage, such, for instance, as single-phase 110-volt 60-cycle alternating-current.

Positioned centrally in the magnetic field created by the coil 24 acting through the pole-pieces 16 and 17 is an armature-unit generally designated by the numeral 25 and comprising a pair of parallel spaced-apart bar-magnets 26 and 27 preferably formed of hard steel or other suitable permanent magnet material and rigidly coupled together in spaced relationship by a collet 28 to which the said bars are suitably staked or otherwise secured as at 29—29 (Fig. 7).

For the purpose of yieldingly urging the armature-unit 25 into a central position, in which its respective opposite ends stand midway between the adjacent polar-projections 18—20 and 19—21, a looped wire spring 30 is employed. The inner end of the said spring 30 is secured to the collet 28 and hence to the bar-magnets 26 and 27 by being entered into a notch 31 in the periphery of the said collet, after which the adjacent metal of the collet is burred thereover, as indicated in Fig. 7. The outer end of the spring 30 enters a diametrical passage 32 in one of the studs 11, and is adjustably clamped therein by a binding-screw 33.

The collet 28 is also formed with an axial passage 34 receiving with a drive-fit the rear end of a shaft 35 oscillating in a bearing 36 formed centrally in the bottom wall of the housing 10, which wall is formed with bosses 37 and 38 to provide a suitable length for the bearing 36.

The inner end of the shaft 35 has staked to it a collet 39 forming a rigid part of a pawl-carrier generally designated by the numeral 40 and located in the center of a carrier-plate 41 carrying at its respective opposite ends complementary studs or posts 42—43.

The post 42, above referred to, has mounted upon it a pawl of generally V-shaped form, designated by the numeral 44 and including a central helical bearing-portion 45 sleeved over the post 42 for pivotal movement thereon. The said pawl also includes an inherently-resilient draft-arm 46 terminating in a lateral actuating-finger 47, and a tensioning-arm 48 diverging from the coil or helical bearing 45 and away from the draft-arm 46. The actuating-finger 47 of the pawl 44 is engaged by the tensioning-arm with the toothed periphery of a ratchet-wheel 49 for turning the same, in a manner as will hereinafter appear.

The stud 43 also mounts a pawl, generally designated by the numeral 50 and corresponding to the pawl 44 above referred to, save that it has somewhat greater length. Like the pawl 44, the pawl 50 includes a helical tubular bearing-portion 51 from the respective opposite ends of which diverge a draft-arm 52 and a tensioning-arm 53. The outer end of the draft-arm 52 is bent laterally to provide an offsetting actuating-finger 54 engageable with the teeth of the ratchet-wheel 49, before referred to, by the tensioning-arm 53.

The respective tensioning-arms 48 and 53 of the pawls 44 and 50 rest against and slide upon that side of a shaft 55 which is remote from the actuating-fingers 47 and 54. The shaft 55, just referred to, has the ratchet-wheel 49 staked to it and bears at its inner end in the bottom wall of the housing 10, and at its outer end in the sealing-plate 12 before described. The extreme outer end of the said shaft 55 mounts a pinion 56 from which the power of the motor may be taken off for driving any desired instrument such, for instance, as a synchronous electric clock, for which latter purpose the particular motor herein illustrated is especially well adapted.

For the purpose of describing the operation of the synchronous motor herein chosen for illustration, let it be presumed that the armature is permanently magnetized, as indicated in Fig. 3, and that the polarities of the polar-projections 18 to 21 inclusive are at the given instant as indicated by full-line characters in the figure referred to.

Under the conditions just above described and when alternating-current is supplied to the coil 24, the permanent magnet armature will be moved by the magnetic flux into substantial alignment with the polar-projections 19 and 20 against a slight counter-urge from the spring 30. The instant that the alternating-current in the coil 24 reverses, the polarities of the polar-projections 18, 19, 20, and 21 will be reversed and become those indicated by broken-line characters in Fig. 3, whereupon the armature-unit will swing over into alignment with the polar-projections 18 and 21, with the initial assistance of the spring 30, and subsequently against a slight counter-urge thereby. As the next half-cycle of the alternations in the current occurs, the polarities will again change back to those indicated by full-line symbols, and the armature will be forcibly moved over into the position in which it is shown by full lines, and so on, back and forth in continuous vibratory motion, one movement for each half-cycle of the alternating-current.

As the armature-unit is vibrated as just above described, the shaft 35 will be correspondingly moved, as will also the pawl-carrier 40 at the opposite end of said shaft. The vibrating movement of the pawl-carrier 40 in consonance with the vibrations of the armature-unit 25 will cause first one and then the other of the inherently-resilient draft-arms 46 and 52 to act with a pull-action through their respective actuating-fingers 47 and 54, to impart a step-by-step turning movement to the ratchet-wheel 49 and the parts 55 and 56 connected thereto. If, as shown, the amplitude of vibratory movement of the armature-unit, etc., is proportioned so that the respective actuating-fingers impart to the ratchet-wheel 49 a half-tooth movement for each individual movement of the pawl-carrier 40, and the ratchet-wheel should have thirty-six teeth as indicated, then, when a 60-cycle alternating current is employed, the speed at which the ratchet-wheel 49 would be rotated would be 100 R. P. M. or, in other words, one complete revolution for each thirty-six cycles of the current supply. During the vibration of the pawl-carrier, as above described, and the concurrent substantially-reciprocating movement of the pawls 44 and 50, said pawls pivot on their respective studs 42 and 43 and do not materially alter their V-shaped form, by reason of their being pivoted, as described, and by reason of the fact that their respective tensioning-arms 48 and 53 rest against the shaft 55 upon which the ratchet-wheel 49 is mounted, and thus at a distance substantially constant with respect to the periphery of the wheel 49 and the actuating-fingers 47 and 54.

It is obvious from the foregoing that, if desired, the amplitude of movement of the pawls 44 and 50 may be altered so that instead of each turning the ratchet-wheel 49 a distance corresponding to but one-half tooth, the said pawls may effect the movement of the ratchet-wheel to the extent of a full tooth or a multiple thereof.

The invention may be carried out in other specific ways than that herein set forth without departing from the spirit and essential characteristics of the invention, and the present embodiment is therefore to be considered in all respects as illustrative and not restrictive, and all changes coming within the meaning and equivalency range of the appended claims are intended to be embraced therein.

I claim:

1. A vibratory electric motor for operation in synchronism with alternating currents of commercial frequencies, comprising: a stator-unit having an alternating-current energizing-core; a vibrating armature located in the alternating-current magnetic field of the stator-unit and vibrated thereby; and means for converting the vibratory motion of the said armature into rotary motion, the said means including a ratchet-wheel and a pull-action pawl of V-shaped form, pivotally connected adjacent the apex of its V-shaped form to the said armature for being vibrated thereby, the said V-shaped pull-action pawl being formed of resilient material and having one arm engageable with the said ratchet-wheel to pull the same in a rotary direction and having its opposite arm constituting a tensioning-arm and bearing against a part of the motor-structure.

2. A vibratory electric motor for operation in synchronism with alternating currents of commercial frequencies comprising: a stator-unit having an alternating current energizing coil and also having a pawl-abutment; a vibrating armature located in the alternating magnetic field created by the said coil and vibrated thereby; and means for converting the vibratory motion of the said armature into a rotary motion, the said means including a ratchet-wheel and a pawl pivotally connected to the said armature for being vibrated thereby, the said pawl having one arm engaging with the said ratchet-wheel and also having a tensioning-arm slidably engaging with the pawl-abutment of the said stator-unit.

3. A vibratory electric motor for operation in synchronism with alternating currents of commercial frequencies comprising: a stator-unit having an alternating current energizing coil and also having a pawl-abutment; a vibrating armature located in the alternating magnetic field created by the said coil and vibrated thereby; and means for converting the vibratory motion of the said armature into a rotary motion, the said means including a ratchet-wheel and a pawl formed of a single length of spring wire and pivotally connected intermediate its respective opposite ends to the said armature for being vibrated thereby, the said pawl having one arm engaging with the said ratchet-wheel and also having a tensioning arm slidably engaging with the pawl-abutment of the said stator-unit.

4. A vibratory electric motor for operation in synchronism with alternating currents of commercial frequencies comprising: a stator-unit having an alternating current energizing coil and also having a pawl-abutment; a vibrating armature located in the alternating magnetic field created by the said coil and vibrated thereby; and means for converting the vibratory motion of the said armature into a rotary motion, the said means including a ratchet-wheel and a pawl formed of a single length of spring wire bent intermediate its respective opposite ends to form a pivot-loop which is pivotally engaged with the said armature, the said pawl having one arm engaging with the said ratchet-wheel and also having a tensioning-arm slidably engaging with the pawl-abutment of the said stator-unit.

5. A vibratory electric motor for operation in synchronism with alternating currents of commercial frequencies comprising: a stator-unit having an alternating current energizing coil and also having a pawl-abutment; a vibrating armature located in the alternating magnetic field created by the said coil and vibrated thereby; and means for converting the vibratory motion of the said armature into a rotary motion, the said means including a ratchet-wheel and a pair of complementary pawls respectively pivotally connected to the said armature on the respective opposite sides of the center thereof for being vibrated by the said armature, each of the said pawls having one arm engaging with the said ratchet-wheel and also having a tensioning-arm slidably engaging with a pawl-abutment on the said stator-unit.

6. A vibratory electric motor for operation in synchronism with alternating currents of commercial frequencies comprising: a stator-unit having an alternating current energizing coil and also having a pawl-abutment; a vibrating armature located in the alternating magnetic field created by the said coil and vibrated thereby; and means for converting the vibratory motion of the said armature into a rotary motion, the said means including a ratchet-wheel and a pair of pawls each formed of a single length of spring wire and each pivoted intermediate its respective opposite ends to the said armature for being vibrated thereby, each of the said pawls having one arm engaging with the said ratchet-wheel and also having a tensioning-arm slidably engaging with a pawl-abutment on the said stator-unit.

7. A vibratory electric motor for operation in synchronism with alternating currents of commercial frequencies comprising: a stator-unit having an alternating current energizing coil and also having a pawl-abutment; a vibrating armature located in the alternating magnetic field created by the said coil and vibrated thereby; and means for converting the vibratory motion of the said armature into a rotary motion, the said means including a ratchet-wheel and a pair of pawls each formed of a single length of spring wire bent intermediate its respective opposite ends to provide a pivot-loop which is pivotally connected to the said armature, each of the said pawls having one arm engaging with the said ratchet-wheel and also having a tensioning-arm slidably engaging with a pawl-abutment on the said stator-unit.

ARTHUR B. POOLE.